Dec. 11, 1951 C. H. HOEPPNER ET AL 2,577,762

INTERVAL GUARD

Filed Oct. 31, 1945 2 SHEETS—SHEET 1

Inventors
CARL HARRISON SMITH JR.
CONRAD H. HOEPPNER

By Ralph L. Chappell
Attorney

Inventors
CARL HARRISON SMITH JR
CONRAD H. HOEPPNER

By Ralph L. Chappell
Attorney

Patented Dec. 11, 1951 2,577,762

UNITED STATES PATENT OFFICE 2,577,762

INTERVAL GUARD

Conrad H. Hoeppner, Washington, D. C., and
Carl Harrison Smith, Jr., Arlington, Va.

Application October 31, 1945, Serial No. 625,934

6 Claims. (Cl. 250—27)

(Granted under the act of March 3, 1883, as amended April 30, 1928; 370 O. G. 757)

This invention relates in general to electronic control circuits and in particular to multivibrators employed for time interval generation. Certain time interval generators possess the characteristic that there is in their cycle of operation a critical period during which the premature application of a signal may disturb the normal interval duration. This is particularly true in the case of generators which produce intervals having a duration determined by the controlled charging of capacitive elements as in regeneratively coupled multivibrators. In certain cases, notably that of a pulse synchronized or driven multivibrator, advantage is taken of this characteristic to shorten the normal multivibrator period and thus determine by external means and within certain limits the interval which it generates. In other cases, this characteristic may be a distinct disadvantage. An example of this is the circuit in which reliance is placed upon the normal functioning of the generator to determine the time interval and in which input signals may arrive during that embarrassing period which allows the signals to influence the interval duration.

It is an object of this invention to provide means and method for the production of uniform time intervals.

It is another object of this invention to provide a guard by means of which the normal interval of a multivibrator may be protected.

It is another object of this invention to provide a means for preventing the premature triggering of a multivibrator.

It is another object of this invention to provide a pulse driven sweep circuit of constant sweep duration regardless of variations in input pulse frequency.

It is another object of this invention to produce a means for dividing the frequency of an input signal.

Other objects and features of this invention will become apparent upon a careful consideration of the following detailed description, when taken together with the accompanying drawings in which.

One of the principles upon which this invention is based is that, if a pulse driven multivibrator be shielded from input pulses during that critical part of its cycle when input pulses may influence the normal operation of the multivibrator, reliance may be placed on the accuracy of the time interval generated even though input pulses be applied at an unpredictable rate. A conventional "one-kick" or "delay" multivibrator, examples of which are shown in Fig. 1A and Fig. 1B, is a means of generating a time interval which may be employed for any one of a number of possible purposes such as creating a delay or controlling an oscilloscope sweep voltage.

Figure 1A:
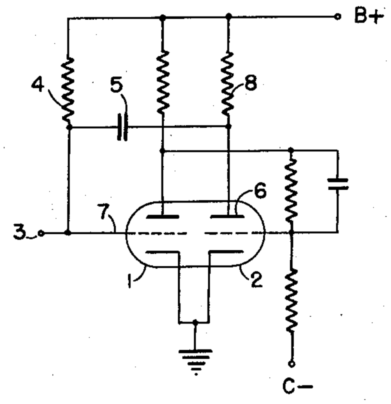
Fig. 1A is a circuit diagram useful in explaining the principles of this invention.

In Fig. 1A, tube elements 1 and 2 represent the vacuum tube components of a conventional "one-kick" or "delay" multivibrator which has only one stable state of equilibrium (tube 1 conducting and tube 2 non-conducting) but which will maintain, upon receipt of a negative signal at terminal 3, a second state (tube 1 non-conducting and tube 2 conducting) for a definite interval of time. This interval for which the second state of the multivibrator can be maintained is determined substantially by the time constant circuit formed by resistor 4, capacitor 5 and the plate resistance of tube 2. Since, during the stable state of the circuit, anode 6 of tube 2 is at B+ potential (tube 2 non-conducting) and grid current flow in tube 1 holds grid 7 at substantially ground potential, the stable state is characterized by the fully charged condition of capacitor 5. When a negative signal is applied at terminal 3, and tubes 1 and 2 are driven into non-conduction and conduction respectively to produce the time interval state of the multivibrator, anode 6 is thereby driven sharply negative. Capacitor 5, which initially is fully charged, holds grid 7 below cutoff until the charge on capacitor 5 is partially dissipated through resistance 4 and tube 2 plate resistance. As soon as sufficient charge has been dissipated to allow grid 7 to rise above cutoff potential, tube 1 again conducts and the regenerative coupling from the output of tube 1 to the input of tube 2 and from the output of tube 2 back to the input of tube 1 causes the tubes to revert to the conditions of conduction characterizing the stable state. Capacitor 5, however, does not immediately return to the condition characterizing the stable state since it must first regain that portion of its charge lost during the time interval. Thus, for a certain period after the time interval has been completed, the multivibrator fails to assume the characteristics of a stable state, the principal point of difference being that capacitor 5 is not fully charged. This certain period, which may be called the secondary recovery period so as to distinguish it from the recovery period during which capacitor 5 discharges to raise grid 7 above cutoff, is one of possible embarrassment since, during its existence, a negative pulse at terminal 3 may again trigger the multivibrator. This time, the negative excursion of anode 6 of tube 2 does not drive grid 7 as far below cutoff for tube 1 and the time interval then generated is shorter.

It should be noted that, as compared to the time interval generated, the secondary recovery period is generally quite short since the charge path of capacitor 5 includes resistor 8 which may be made small compared to resistor 4 and the grid to cathode resistance of tube 1 which is small compared to the plate resistance of tube 2. Another possible source of embarrassment is the negative input pulse which arrives at terminal 3 just at the instant tube 1 is ready to conduct to end the time interval and which thereby holds tube 1 cut off beyond its normal interval. If both positive and negative pulses are applied at terminal 3, it will be seen that a positive pulse arriving during the latter part of the time interval may cause tube 1 to conduct prematurely and thus shorten the time interval.

Figure 1B:
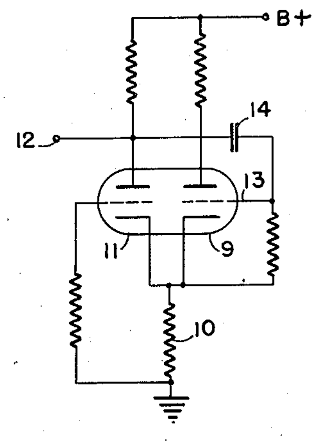
Fig. 1B is a variant of the circuit diagram of Fig. 1A.

In Fig. 1B is shown a "servo" or "cathode-coupled" multivibrator of the "one-kick" type which functions in a similar manner to the multivibrator of Fig. 1A. In this version, tube 9 conducts during the stable state and the resultant current through common cathode resistor 10 results in a potential which holds tube 11 cut off. A negative signal at point 12 is communicated to grid 13 of tube 9 and causes the multivibrator to change states to start the time interval generation. As soon as capacitor 14 partially discharges, the time interval ends and the secondary recovery period begins. Although the multivibrators of Fig. 1A and Fig. 1B employ different methods of coupling and the time constant circuits are somewhat different, they both have a secondary recovery period and both may be caused to depart from normal operation by the application of an input signal during a certain part of their cycles. There are other similar types of time interval generators depending, as these do, upon the undisturbed discharging and charging of a capacitor or capacitors for normal operation but they differ only in circuit arrangement.

If the input of such a time interval generator is guarded against the application of signals during the time interval generated and during the secondary recovery period, it will be seen that reliance may be placed upon the uniformity of successive time intervals even though input signals may occur too rapidly for the generator to follow.

Figure 2:
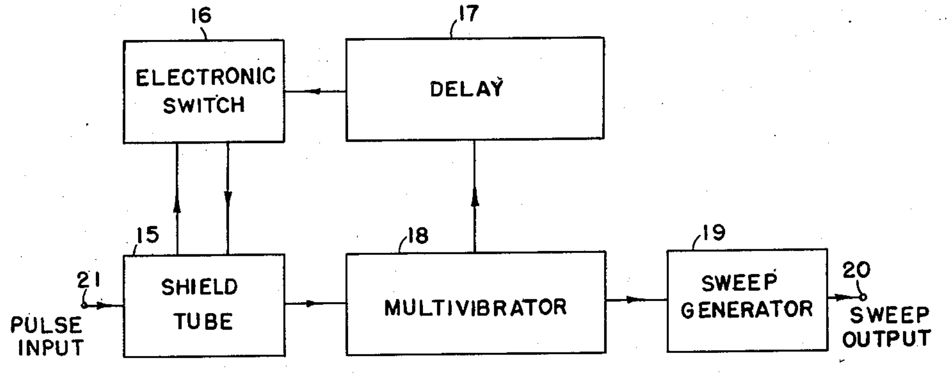
Fig. 2 is the block diagram of one embodiment of this invention.

Fig. 2 illustrates in block diagram one embodiment of this invention in which a shield tube 15, an electronic switch 16, and a delay means 17 serve to guard the interval generated by multivibrator 18. The interval generated by multivibrator 18 is employed to determine the sweep time of sweep generator 19 the output of which appears as a linearly changing voltage at output 20. This sweep voltage is applied to the terminals of an oscilloscope tube (not shown) for the conventional oscillographic presentation of data. It is, of course, important that the sweep time be of uniform duration and that premature triggering of multivibrator 18 be prevented.

In operation, an input pulse at terminal 21 is passed by shield tube 15 and results in the triggering of multivibrator 18 into generation of the time interval. This same input pulse results in the triggering of electronic switch 16 into that one of its two states in which shield tube 15 is blocked from communicating pulses to multivibrator 18. As soon as multivibrator 18 completes the time interval, it impresses a signal upon delay means 17. After the resulting delay and during which time multivibrator 18 has completed its secondary recovery period, delay means 17 impresses a signal on electronic switch 16 which returns that switch to the other of its two states in which shield tube 15 is unblocked and shield tube 15 may again communicate a pulse to multivibrator 18. During the entire time electronic switch 16 blocked shield tube 15, and during which time multivibrator 18 generated its time interval and progressed through its secondary recovery period, pulses applied at terminal 21 were impotent insofar as affecting multivibrator 18 was concerned.

Figure 3:
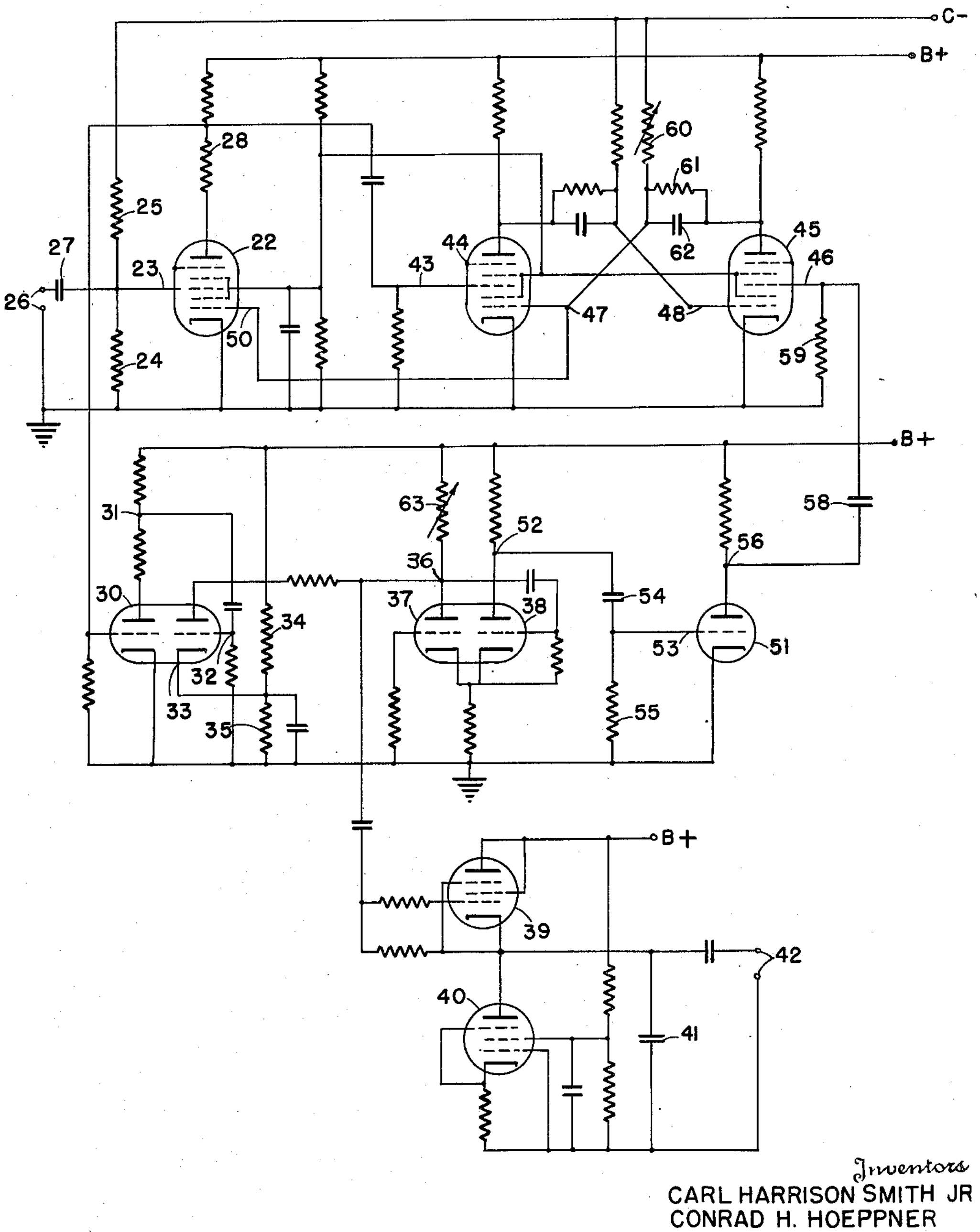
Fig. 3 is the circuit diagram of one embodiment of this invention.

In Fig. 3, the embodiment of Fig. 2 is shown in one of the circuit forms it may assume. Multigrid vacuum tube 22 represents a shield tube which, in the quiescent condition of the circuit, is held nonconducting by virtue of the connection of second control grid 23 to ground through resistor 24 and to C— potential through resistor 25. Unless otherwise prevented, however, a positive signal at input terminals 26 and applied to grid 23 through capacitor 27 causes tube 22 to produce a negative signal at its plate circuit 28. Negative signals at terminals 26 have no effect under any circumstances inasmuch as they merely increase the cutoff bias at grid 23. Vacuum tube element 30 serves to invert the negative signals which appear at plate circuit 28 of tube 22 so that they appear as positive signals at plate circuit 31 and at grid 32 of trigger tube 33. Such positive signals at grid 32 cause tube 33 to overcome the positive cathode bias supplied at the junction of resistors 34 and 35 and conduct so as to reduce the potential sharply at point 36 in the plate circuit of tube 33. Tube elements 37 and 38 represent the vacuum tube components of a time interval generator of the type illustrated in Fig. 1B. Point 36 just mentioned is also in the plate circuit of tube 37 and corresponds to point 12, the trigger point input of the multivibrator of Fig. 1B. Thus, when tube 33 is caused to conduct, the time interval generator is triggered and proceeds in the hereinbefore mentioned manner.

The negative voltage surge appearing at point 36 is communicated to a conventional sweep voltage generator represented by vacuum tubes 39 and 40 so as to cut off tube 39 and cause capacitor 41 to discharge in a linear manner through tube 40 to create the desired sweep voltage at terminals 42. The potential reached by this voltage, i. e., the sweep duration is determined by the length of time tube 39 is cutoff which, in turn, is a function of the time interval generated by the multivibrator.

Reverting now to plate circuit 28 of shield tube 22, it will be seen that the negative signal appearing at that plate circuit is also applied to second control grid 43 of multigrid tube 44. Tubes 44 and 45 represent the vacuum tube components of a conventional scale-of-two counter or electronic switch which has two stable states of equilibrium (44 conducting and 45 non-conducting and vice-versa) either of which may exist according to the signals impressed upon second control grids 43 and 46. The usual regenerative connections are made from the output of each tube to first control grids 47 and 48. The quiescent condition of the circuit of Fig. 3 finds tube 44 conducting so that the positive signal at terminals 26 which starts the time interval also triggers the electronic switch over into the condition in which tube 44 is non-conducting. Tube 44 is held non-conducting by virtue of the potential at grid 47 which is communicated to grid 50 of shield tube 22 so as to hold that tube non-conducting as long as the electronic switch is in that state in which tube 44 is held non-conducting. By means of this cross connection of the switch and the shield tube, any signal appearing at terminals 26 under the aforementioned condition is rendered impotent.

Trigger grid 46 of tube 45, which provides the means by which the electronic switch may be placed back into the state in which tube 44 is again rendered conducting, is responsive to negative signals only since it normally is at ground potential. Such negative signals may only result when delay tube 51 changes from a non-conducting to a conducting state. It will be seen that this change may only occur when tube 38 of the time generator is rendered conducting (as it is at the end of the time interval). The coupling between plate circuit 52 of tube 38 and grid 53 of tube 51, comprising capacitor 54 and resistor 55, has been chosen so as to have a time constant such that, when tube 38 is rendered conducting at the end of a time interval and grid 53 is driven below cutoff by the negative excursion of plate circuit 52, capacitor 54 discharges sufficiently to permit tube 51 to conduct only after the secondary recovery of the multivibrator has been completed. When tube 38 is driven non-conducting at the beginning of the time interval, capacitor 54 charges through the grid-to-cathode resistance of tube 51. Any positive voltage change at grid 53 causes little or no change at plate circuit 56 since tube 51 is normally heavily conducting. The passage of tube 38 from non-conduction to conduction at the end of the time interval results in the production of a rectangular positive pulse at plate circuit 56. The trailing edge of this positive pulse is differentiated by the coupling circuit comprising capacitor 58 and resistance 59 to produce a sharp negative signal at grid 46 of tube 45. The effect of tube 51 and its input and output circuits is to delay a signal generated at the end of the time interval of the multivibrator and then apply it to the electronic switch. This delayed signal triggers the electronic switch back into its quiescent state in which shield tube 22 is again responsive to the incoming pulses.

In operation, assuming quiescence of the circuit of Fig. 3, a positive pulse applied at terminals 26 is amplified, inverted and passed by shield tube 22 to inverter tube 30 where it is re-inverted so as to appear as a positive pulse at grid 32 of trigger tube 33. This positive pulse triggers the multivibrator comprising tubes 37 and 38 and a negative voltage appears at plate circuit 36 which allows the sweep voltage to be generated at terminals 42. The positive pulse which was amplified and inverted by shield tube 22 also triggers the electronic switch comprising tubes 44 and 45 into the state in which tube 22 is held unresponsive to input pulses at terminals 26. Tubes 37 and 38 complete their time interval generation and tube 38 is driven conducting. In doing so, it holds tube 51 cut off for a long enough time for quiescent conditions to re-establish themselves in the multivibrator (secondary recovery period complete). When tube 51 finally is allowed to conduct at the end of its delay period, the electronic switch is triggered at grid 46 back into the state in which shield tube 22 may again respond to an input pulse. Thus the interval generated by the multivibrator is guarded by the shield tube, the electronic switch and the delay tube circuit.

Those versed in the art will perceive various changes which may be made in the circuit such as the substitution of a different delay means for tube 51. Such a substitution could be a delay multivibrator similar to those shown in Fig. 1A and Fig. 1B. The negative excursion of plate circuit 52 at the end of the time interval may be employed to trigger the delay multivibrator which would then trigger the electronic switch at the end of its own delay period. Another similar substitution would be to replace inverter tube 30, trigger tube 33, and the multivibrator comprising tubes 37 and 38 with a multivibrator of the type shown in Fig. 1A. In this case, the multivibrator time generator would be directly responsive to the amplified negative signal appearing at plate circuit 28 of shield tube 22. Still another substitution which may be made is to employ other known types of electronic switches for the electronic switch comprising multigrid tubes 44 and 45. The principal feature to be observed in this circuit choice is that the switch should not respond to a positive signal from the delay means if a negative signal is employed to mark the end of the delay. Multigrid tubes have certain advantages for this type of operation but suitable switches may be constructed from triodes or pentodes as well. In this connection, it should be pointed out that a self-returning switch offers some advantage in that it may be used to guarantee that the circuit will not accidently be left in the psuedo-quiescent condition in which tube 45 rather than tube 44 conducts. The existence of this condition would hold tube 22 unresponsive and thus prevent circuit operation. Such a situation may be avoided in the circuit of Fig. 3 by returning grid 47 to B+ potential rather than C— potential through resistor 60. Resistor 61 may be then eliminated and resistor 60 and capacitor 62 chosen so that the self-switching action will occur (i. e., tube 44 rendered conducting and tube 45 non-conducting) a comfortable margin of time after the secondary recovery of the time interval generator is complete regardless of whether or not a negative signal is impressed upon grid 46 by the delay means. With such an arrangement, the delay means may be dispensed with but this is not particularly desirable since the total time for which shield tube 22 is unresponsive is then fixed by the switch rather than by the time interval generator and the delay means. Where a selectable sweep length is required, as may be obtained by variation of resistor 63 in plate circuit 36 of the multivibrator, and it is required that a sweep be generated in response to every pulse which will not compromise the time interval generated, it will be obvious that the unresponsive time of shield tube 22 must depend upon the time interval generated and the fixed delay rather than upon the action of a self-returning switch if a second control, such as variable resistor 60 in grid 47 return of tube 44, is to be avoided. The interval guard need not be confined to apparatus for the generation of a uniform sweep voltage. For example, it may be employed as a frequency divider. Since a positive signal appears at plate circuit 31 of tube 30 only once during each interval generated, point 31 would produce only one output signal for a selectable number of input signals applied at terminals 26. If the output polarity need not be the same as the input polarity, the frequency divided output consisting of negative pulses may be obtained at plate circuit 28 of tube 22.

Since certain further changes may be made in the foregoing construction and different embodiments of the invention may be made without departing from the scope thereof, it is intended that all matter shown in the accompanying drawings are set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. The method of guarding the time interval generated by a multivibrator which comprises, amplifying an input pulse, causing said amplified input pulse to initiate the operation of a multivibrator, also causing said amplified pulse to institute a switching action which prevents amplification of subsequent input pulses, generating a signal at the end of the time interval of said multivibrator operation, delaying said generated signal, and causing said delayed signal to institute a switching action which permits amplification of subsequent input pulses.

2. Apparatus for producing a uniform time interval comprising, a shield tube for amplifying input signals, a time interval signal generator connected to said shield tube responsive to signals amplified thereby, switching means also connected to said shield tube responsive to signals amplified thereby to render said shield tube inoperative, and delay means connecting said time interval generator and said switching means responsive to and delaying a signal from said time interval generator corresponding to the end of the time interval generated thereby, said switching means also being responsive to said delayed signal in such a manner as to render said shield tube operative.

3. Apparatus for producing a uniform time interval comprising, a shield tube for amplifying input signals, a multivibrator connected to said shield tube responsive to the signals amplified thereby, electronic switching means having two stable states also connected to said shield tube, said connection being arranged to render said shield tube operative responsive to one of said states and inoperative in response to the other of said states, a second connection between said shield tube and said switch to couple the signals amplified by said shield tube to said switch to initiate the stable state in which said shield tube is held inoperative, and delay means connecting said multivibrator and said switching means responsive to and delaying a signal from said multivibrator corresponding to the end of the time interval generated thereby, said switching means also being responsive to said delayed signal in such a manner as to initiate the stable state in which said shield tube is held operative.

4. A pulse driven sweep circuit comprising, a shield tube for amplifying an input signal, a one-kick multivibrator connected to said shield tube responsive to the signal amplified thereby, said multivibrator generating, in response to said amplified signal, a time interval defined by the unstable state of said multivibrator, switching means also connected to said shield tube responsive to the signal amplified thereby in such a manner as to render said shield tube inoperative, delay means connecting said multivibrator and said switching means responsive to and delaying a signal from said multivibrator corresponding to the end of said time interval, said switching means also being responsive to said delayed signal in such a manner as to render said shield tube operative, and means connected to said multivibrator generating a voltage which changes in a substantially linear manner for the duration of said time interval.

5. A pulse driven sweep circuit comprising, a shield tube for amplifying an input signal, an inverter tube connected to said shield tube responsive to the output thereof, a trigger tube connected to said inverter tube responsive to the output thereof, a one-kick multivibrator connected to said trigger tube responsive to the output thereof, said multivibrator generating, in response to the output of said trigger tube, a time interval defined by the unstable state of said multivibrator, switching means also connected to said shield tube responsive to the output thereof in such a manner as to render said shield tube inoperative, vacuum tube amplifying means, resistance capacitance means coupling the output of said multivibrator to said vacuum tube means in such a manner as to cause it to produce a pulse the leading edge of which occurs in coincidence with the end of said time interval, differentiating means coupling the output of said vacuum tube means to said switching means, said switching means also being responsive to the differentiated trailing edge of said pulse in such a manner as to render said shield tube operative, and means connected to said multivibrator generating a voltage which changes in a substantially linear manner for the duration of said time interval.

6. Apparatus for producing voltage pulses of uniform duration comprising, a single cycle multivibrator, an amplifier for coupling tripping signals to said multivibrator, a dual stability trigger circuit connected to said amplifier to hold said amplifier operative in response to one state of the trigger circuit and inoperative in response to the other state, a second connection between said amplifier and said trigger circuit to initiate said other state responsive to a tripping signal from said amplifier, and means connected between said multivibrator and said trigger circuit for initiating said one state a predetermined time interval following the conclusion of the multivibrator cycle.

CONRAD H. HOEPPNER.
CARL HARRISON SMITH, Jr.

REFERENCES CITED

The following references are of record in the file of this patent:

UNITED STATES PATENTS

| Number | Name | Date |
|---|---|---|
| 2,221,665 | Wilson | Nov. 12, 1940 |
| 2,332,325 | Levoy, Jr. | Oct. 19, 1943 |
| 2,413,182 | Hollingsworth et al. | Dec. 24, 1946 |
| 2,468,058 | Grieg | Apr. 26, 1949 |